United States Patent [19]

Andersson et al.

[11] Patent Number: 5,006,994

[45] Date of Patent: Apr. 9, 1991

[54] METHOD FOR DETERMINING THE SPECIFIC FUEL CONSUMPTION OF AN INTERNAL COMBUSTION ENGINE AND APPARATUS THEREFOR

[75] Inventors: Kjell Andersson, Stenstorp; Lennart Eriksson, Köping, both of Sweden

[73] Assignee: ASE Europe AB, Arboga, Sweden

[21] Appl. No.: 340,227

[22] Filed: Apr. 19, 1989

[30] Foreign Application Priority Data

Apr. 19, 1988 [SE] Sweden ............................ 8801443

[51] Int. Cl.$^5$ .................................................. G01F 9/00
[52] U.S. Cl. ........................................... 364/442; 73/113
[58] Field of Search .................. 364/442; 73/113, 114

[56] References Cited

U.S. PATENT DOCUMENTS

| | | | |
|---|---|---|---|
| 2,672,754 | 3/1954 | Kent, Jr. .................................. | 73/113 |
| 2,741,914 | 4/1956 | Irion ....................................... | 73/113 |
| 4,286,324 | 8/1981 | Ingram ................................... | 364/442 |
| 4,459,671 | 7/1984 | Teass et al. ............................ | 364/442 |
| 4,559,599 | 12/1985 | Habu et al. ............................ | 364/442 |
| 4,716,872 | 1/1988 | Pol .......................................... | 73/113 |

FOREIGN PATENT DOCUMENTS 298821 5/1972 Austria .

Primary Examiner—Gary Chin
Attorney, Agent, or Firm—Walter Ottesen

[57] ABSTRACT

The invention relates to a method and an apparatus for determining the specific fuel consumption of an internal combustion engine by measuring the change in weight of a pot containing fuel for consumption by the engine during a specific, selectable time. The apparatus for performing this method includes a data acquisition system equipped with a number of measuring points. Sensors at the measuring points feed, through the data acquisition system, signals representing the change in weight of the fuel pot, the speed of the engine and the torque of the engine into a computer. The computer is programmed for measuring at constant speed and constant torque, within selectable tolerances, and for measurement during a specific, selectable period of time. The method of the invention permits the use of statistical methods to assure reliable and accurate measurement results with the shortest possible measurement period, while providing high flexibility in interfacing with an operator or central computer system.

2 Claims, 1 Drawing Sheet

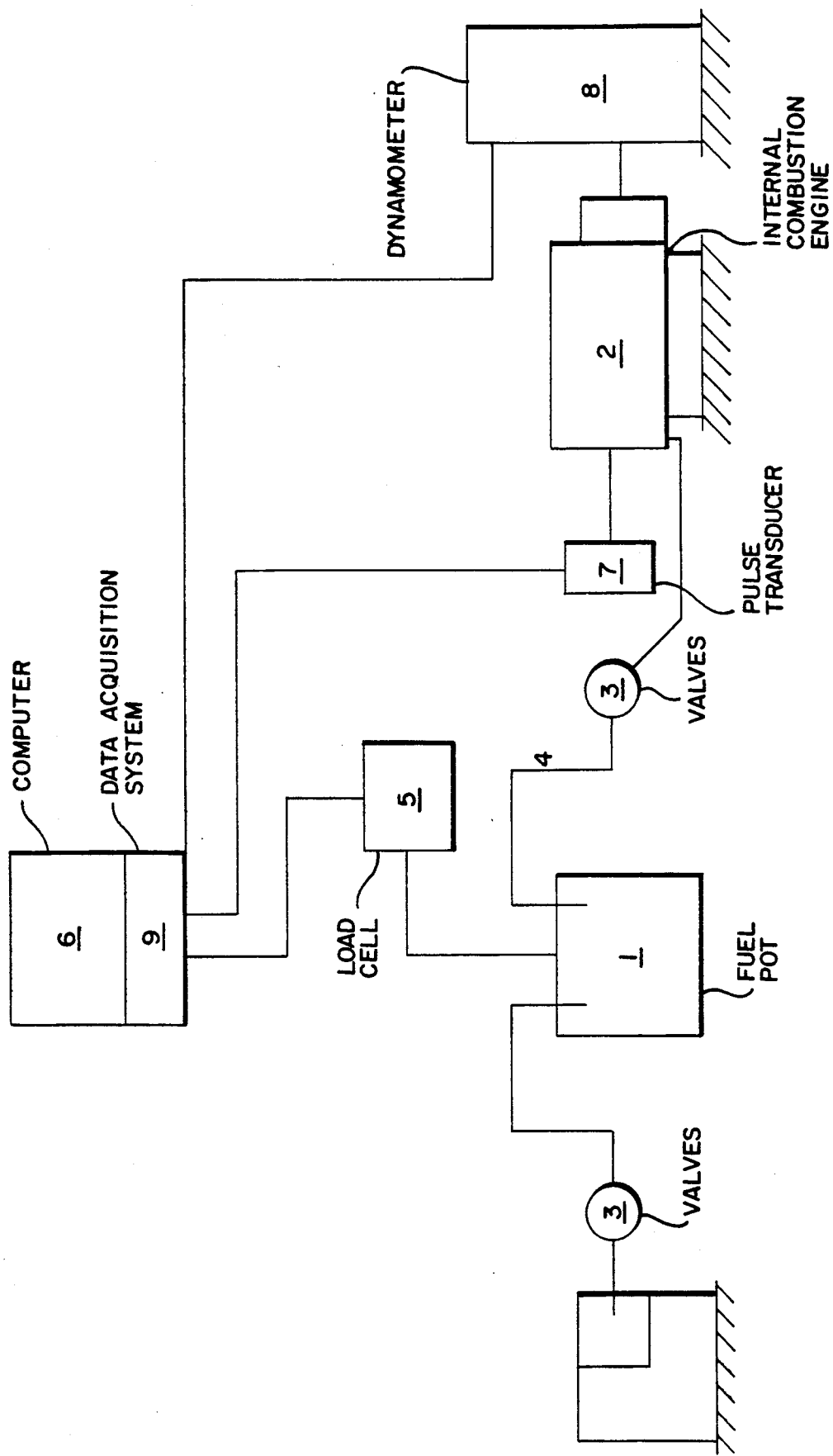

METHOD FOR DETERMINING THE SPECIFIC FUEL CONSUMPTION OF AN INTERNAL COMBUSTION ENGINE AND APPARATUS THEREFOR

FIELD OF THE INVENTION

The invention relates to a method for determining the specific fuel consumption of an internal combustion engine by measuring the change in weight of a pot containing fuel and by using a data acquisition and computer system to monitor the speed and torque of the engine and the amount of fuel consumed by the engine during a preset, selectable period of time. The computer records the measurement values continuously during the measuring period, after which the information is processed and evaluated by the computer which is programmed for measurement at constant engine speed and torque.

The invention also relates to an apparatus for performing the above method by means of a fuel scale which includes: a pot containing fuel resting on a load cell with a built-in strain gauge, a pulse transducer attached to the engine shaft for measuring engine speed, a dynamometer for measuring engine torque and a data acquisition and computer system connected to these sensor devices.

BACKGROUND OF THE INVENTION

Several known methods are based on determining the time it takes to consume a given amount of fuel; that is, the time is recorded at start and stop of the consumption of the predetermined amount of fuel without any monitoring of the process during the fuel consumption.

Austrian Patent 298 821 relates to a measuring device for measuring the fuel consumption of an internal combustion engine on a test bench. It consists of two measuring pots, each one supported by a weight measuring device based on the strain gauge principle. The pots are connected to a common fuel tank, and each one of the pots is connected to the internal combustion engine. The lines between the fuel tank and the measuring pots, as well as the lines between the measuring pots and the internal combustion engine, are equipped with electrically controlled valves. The measuring pots are drained and filled alternately by a switching device that opens and closes the valves in response to pulses from the weight measuring devices. As soon as preset maximum and minimum values of the weight of the pots are registered by the measuring devices, they transmit pulses to the switching device. The measuring period is divided into a number of time intervals, during which a fuel consumption corresponding to the change in weight of the measuring pots is determined.

The total fuel consumption during the measuring period is determined by adding the consumption of the time intervals together.

This method has the disadvantage that if disturbances occur during the measuring period, in the form of changes in engine speed or torque, and this is not detected, an erroneous result can be obtained. Also, even small measuring errors at start and stop will cause direct errors in the overall result.

SUMMARY OF THE INVENTION

It is an object of the invention to provide a method for determining fuel consumption that meets high demands on reliability, accuracy and speed of measurement. It is another object of the invention to provide a measurement and fuel weighing apparatus for performing the method of the invention. It is still another object to provide such an apparatus that contains few mechanical parts and that affords high reliability and easy maintenance.

The method of the invention is for determining the specific fuel consumption of an internal combustion engine by feeding, from sensors through a signal conditioning system to a computer, signals representing the torque and the speed of the engine and the change in weight of a pot containing fuel for consumption by the engine.

The method of the invention includes the: continuous recording and storing by the computer, during the measuring period, of values of the engine speed, the engine torque, the change in weight of the fuel pot and the number of revolutions of the engine shaft; and, the programming of the computer for measurements at constant speed and torque, within selectable, preset limits of tolerance from a preset, selectable value, for a selectable measuring period, which can be varied in small increments to achieve maximum accuracy. If the engine speed or torque exceeds the preset limits during the measuring period, the method provides that the computer will terminate the measurement and start a new one; if the engine speed and torque are constant within the preset limits, the computer will, after the measurement period, calculate a linear fuel consumption curve by means of a least-squares method, and a mean torque and a mean speed; if mean speed or mean torque from the preset values is greater than a preset selectable tolerance, or if the deviation of any value of fuel consumption from the above-mentioned curve is greater than a preset, selectable tolerance, the measurement will be disqualified and a new one started; within the preset limits, the computer will calculate the fuel consumption per piston stroke based on the fuel consumption curve, the measuring period, the number of revolutions during the measuring period and the number of cylinders, whereby the statistical certainty of the result is also specified.

According to the invention, the fuel consumption of an internal combustion engine is determined by measuring the engine torque, the engine speed and the amount of fuel consumed by the engine during a preset, selectable period of time. According to the invention, the amount of fuel consumed by the engine is determined by a number of measurements of the change in weight of a pot containing fuel by means of a weight measuring device. The advantage of this method is that values are recorded continuously during the course of the measuring period and can be processed and evaluated afterwards. A prerequisite is that the change in weight of the pot can be measured with sufficient accuracy. This is accomplished by noise reduction through integration of the measuring signal during a preset, selectable period. It is also possible to increase the accuracy and statistical certainty of the fuel consumption measurement by increasing the length of the measuring period.

BRIEF DESCRIPTION OF THE DRAWING

The invention will be further described below with reference to the drawing which shows a block diagram of an embodiment of the measuring apparatus according to the invention.

DETAILED DESCRIPTION OF THE INVENTION

As shown in the block diagram, the system includes a number of measuring points for measuring the engine torque, the engine speed and the amount of fuel consumed. Sensors are provided at these measuring points and have output signals which represent the operating quantities at the different measuring points. The output signals are fed to a computer through a data acquisition and signal conditioning system. To simplify the evaluation of the measurement, the computer is programmed for measuring at constant engine speed and engine torque, within preset, selectable limits of tolerance and for a preset, selectable measuring period. The computer can also be programmed for measuring at a preset, constant value of the engine speed as well as of the engine torque within preset selectable limits of tolerance of each value. The signals representing the amount of fuel consumed during the selected measuring period are also fed to the computer through the data acquisition and signal conditioning system. This measurement is obtained by means of a pot containing fuel for engine consumption, supported by a load cell equipped with a strain gauge. Every change in weight of the pot will change the output signal from the strain gauge, which is read by the computer.

In the embodiment of the apparatus for performing the method shown in the block diagram, the fuel pot 1 is connected to an internal combustion engine 2 through a number of fuel pipes 4 equipped with valves 3. The fuel pot 1 is supported by a load cell 5 which contains a strain gauge. For every change in weight of the fuel pot 1, there is a change in the output signal from the strain gauge, which is sensed by a data acquisition system 9 that feeds the data into a computer 6. The total change in weight of the pot during a certain, arbitrarily selected time thereby constitutes a measure of the fuel consumption of the engine during that time.

The engine speed is measured by means of a pulse transducer 7 attached to the engine shaft and the engine torque is measured by means of a dynamometer 8 connected to the engine shaft. The computer 6 is programmed for constant speed and constant torque within preset, selectable limits of tolerance. If the deviations from these values of speed and torque are too large, the computer will disqualify the cycle and start a new one.

When the measuring cycle starts, the amount of fuel is measured by means of the strain gauge. The output signal from the strain gauge is recorded by the computer 6 at times that are controlled by an accurate real-time clock in the computer system. Engine speed is measured as the mean rate of pulses from a pulse transducer 7 attached to the engine shaft.

Measurements of fuel amount, speed and torque are made several times per second, controlled by the computer real-time clock, and the results are stored in a table in the computer memory. During the entire measuring period, which can be varied in increments of 0.5 second in order to permit measurements with maximum accuracy, the total number of revolutions of the engine shaft is counted by continuous counting of the pulses from the pulse transducer 7 which update a counter in the computer 6.

During the measurement period, the computer 6 checks that the speed and torque of the engine 2 are within preset, selectable limits of tolerance from preset values. If the limits are exceeded, the measuring period will be interrupted and a new one started.

At the end of the measuring period, the computer checks the stored tabulated values to determine whether the speed has been constant within the preset limits of tolerance. If not, the measurement is disqualified and a new one is started. If the speed check approves the values, the computer calculates a linear fuel consumption curve as a function of time by means of the least-squares method, as well as a mean torque. The deviation of the tabulated values from the consumption curve and from the mean torque is calculated. If the deviation is greater than a preset, selectable tolerance, the measurement is disqualified and a new one is started.

If this check is also passed, the computer calculates the fuel consumption per piston stroke based on the fuel consumption curve, the number of engine shaft revolutions, the number of cylinders and the length of the measuring period.

The computer program can, of course, be revised to suit other types of internal combustion engines or to deliver the result in other forms, for example, consumption per unit time, without staying beyond the limits of the invention.

It is understood that the foregoing description is that of the preferred embodiments of the invention and that various changes and modifications may be made thereto without departing from the spirit and scope of the invention as defined in the appended claims.

What is claimed is:

1. An apparatus for making a measurement of the specific fuel consumption of an internal combustion engine, the apparatus comprising:
    a fuel pot connected to the internal combustion engine via fuel line means equipped with a valve;
    a load cell having strain gauge sensor means on which said fuel pot is supported for measuring a change in weight of the pot during a preset, selectable time, resulting from the consumption of fuel by the engine during said time;
    pulse transducer sensor means connected to the engine shaft for detecting the speed of the engine and providing a mean pulse rate indicative of said speed;
    dynamometer sensor means connected to the engine shaft for measuring the engine torque and providing an analog input signal indicative of said torque;
    a data acquisition system including signal conversion units for converting said analog input signal to frequency;
    said data acquisition system further including a measuring unit for measuring said mean pulse rate for a selectable number of pulses;
    a computer system for recording the data fed to the computer system through said data acquisition system from corresponding ones of said sensor means at each measuring point during the measuring period, for subsequent processing and evaluation of said measurement;
    a counter means included in said computer system for accumulating the total number of revolution pulses indicative of engine speed during a preset selectable measuring period; and,
    means included in said computer system for disqualifying said measurement and starting a new measurement of the specific fuel consumption when said means pulse rate or said engine torque exceeds predetermined limits thereof.

2. A method for performing a measurement of a specific fuel consumption of an internal combustion engine, the method comprising the steps of:

obtaining respective signals from a plurality of sensors indicative of engine speed, engine torque and a change in weight of a pot containing fuel to be consumed by the engine;

passing said signals through a conditioning system and then to a computer;

continuously recording and storing in the computer, during a measuring period, the change in weight of the fuel pot and a number of revolutions of an engine shaft;

programming the computer for performing said measurement of the specific fuel consumption at constant engine speed and engine torque, within selectable, preset limits of tolerance of said engine speed and engine torque during said measuring period, which can be varied in small increments of 0.5 second to achieve maximum accuracy;

terminating said measurement and starting a new measurement of the specific fuel consumption when the engine speed or torque exceeds the preset limits during the measurement period;

calculating a linear fuel consumption curve as a function of time with said computer by a least-squares method utilizing said change in weight, as well as calculating a mean torque and a mean speed, after the measurement period and provided the engine speed and torque are constant within the preset limits;

disqualifying said measurement and starting a new measurement of the specific fuel consumption when said mean speed or said mean torque exceeds said limits of said tolerance, or if any stored tabulated value from said curve is greater than a predetermined value; and, calculating with the computer the fuel consumption per piston stroke based on the fuel consumption curve, the measuring period, the number of revolutions of the engine shaft during the measuring period and the number of cylinders, whereby a statistical certainty of the measurement of the specific fuel consumption can be specified.

* * * * *